United States Patent [19]

Hutchinson et al.

[11] 4,271,956
[45] Jun. 9, 1981

[54] FINGER CONSTRUCTION FOR A COMBINE PLATFORM AUGER

[75] Inventors: Eugene B. Hutchinson, East Moline; James M. Van Auwelaer, Coal Valley, both of Ill.

[73] Assignee: Deere & Company, Moline, Ill.

[21] Appl. No.: 103,985

[22] Filed: Dec. 17, 1979

[51] Int. Cl.³ ............................................. B65G 25/08
[52] U.S. Cl. ..................................... 198/613; 198/693
[58] Field of Search ............... 198/610, 611, 612, 613, 198/692, 693, 723; 403/191, 234, 235, 237

[56] References Cited

U.S. PATENT DOCUMENTS

| | | | |
|---|---|---|---|
| 1,357,763 | 11/1920 | Collins | 403/235 |
| 2,294,541 | 9/1942 | Feucht | 403/234 |
| 2,701,634 | 2/1955 | Carroll | 198/613 X |
| 3,142,375 | 7/1964 | Luke | 198/693 |
| 3,428,300 | 2/1969 | Sconzo | 403/235 X |

FOREIGN PATENT DOCUMENTS 2258549  8/1975  France ..................................... 403/234

Primary Examiner—James L. Rowland

[57] ABSTRACT

In the central beater portion of the platform auger of a conventional grain cutting platform for a combine harvester, the finger and finger bearing assemblies are constructed so that each may be removed individually for repair or replacement without disturbing other finger assemblies or the fixed crankshaft on which the finger assemblies are journaled. Each bearing assembly consists of two halves hinged together and closing to define a cylindrical bearing bore embracing the finger shaft. Portions of the two bearing halves opposite the hinge are recessed in their facing surfaces to receive the enlarged butt end of a finger, so as to align, clamp and retain the finger. A single clamping fastener is used to maintain the integrity of the finger and bearing assembly in operation.

5 Claims, 8 Drawing Figures

FINGER CONSTRUCTION FOR A COMBINE PLATFORM AUGER

BACKGROUND OF THE INVENTION

This invention relates to harvesting machine conveyors and more particularly to the construction of a retracting finger assembly in a beater-like conveying element.

It is common in combine harvesters to assist the transfer of crop material into a feeder conveyor for delivery to a threshing cylinder by providing, in a gatherer such as a grain cutting platform, a form of beater co-axial and integral with the platform auger and immediately ahead of the feeder conveyor. A common form of beater consists of a rotating and retracting finger arrangement in which a finger crankshaft is fixed inside of and eccentric to a rotating drum. Elongated fingers journaled on the finger crankshaft extend generally radially through guide slots in the surface of the drum so that, as the drum rotates, the fingers are rotated about their shaft and reciprocated in the guide slots due to the eccentricity of the finger shaft with respect to the drum. The arrangement is timed so that the fingers extend to engage crop material and sweep it under the drum into the feeder conveyor and retract to assist in releasing the material into the feeder conveyor. An arrangement of this kind is shown in U.S. Pat. No. 2,701,634 Carroll.

A combine gatherer platform must operate in a variety of soil and crop conditions and is often operated at near maximum capacity so that its conveying elements, including a platform beater portion and fingers, are subjected to heavy and fluctuating loading, to abrasion from dirt gathered in with the crop, and possibly, to direct mechanical damage from inadvertent feeding of foreign bodies such as rocks and scrap metal into the conveyor system. There is thus a relatively frequent need to remove and reinstall platform auger finger assemblies, to replace worn out finger bearings and/or broken fingers.

In the conventional construction of platform augers, the auger assembly, including a central drum portion, is journaled on a fixed transverse shaft supported in the frame of the platform and provided with suitable drive means. In the beater area of the platform auger, the fixed crankshaft is offset for journaling the finger assemblies with required eccentricity. Generally, there is a releasable connection between the offset crankshaft portion and the remainder of the shaft. Finger bearings are of one piece and to replace a bearing or complete finger assembly, it is necessary to detach at least one end of the shaft offset portion and remove a number of finger assemblies by sliding them from the shaft to gain access to the damaged one. Access for this disassembly operation is gained through hand or access holes in the auger tube, normally closed by removable covers. Replacing finger assemblies or finger bearings in this way is awkward, inconvenient and time consuming.

An attempt to make finger assembly service and repair more convenient is disclosed in U.S. Pat. No. 3,142,375 Luke. By providing a two-piece bearing construction, Luke makes it unnecessary to disconnect the finger crankshaft but suggests a finger construction requiring the considerable dexterity involved in: positioning two unconnected bearing halves on the finger crankshaft; and aligning and holding them opposite one another on the shaft while maneuvering into place a pair of loose spring clamps, one for each end of the bearing. This must be accomplished while reaching through an access opening of necessarily limited size. In addition, Luke suggests fingers rigidly secured to one of the bearing halves, making independent repair or replacement of the respective bearing and finger portions of an assembly impractical or uneconomic.

SUMMARY OF THE INVENTION

Accordingly, it is an object of the invention to provide an internally and eccentrically journalled retracting finger assembly design for a rotatable beater-like conveyor element such as a portion of a combine header platform auger which has improved service life and which may be more quickly and easily replaced in the event of damage or extreme wear. Other objects are that the bearing portion of the assembly should be impact-resistant and quiet in operation as well as relatively low in manufacturing cost.

It is a feature of the invention to form the body of the finger bearing in two main parts, normally coupled and secured together and embracing the finger shaft, but conveniently releasable, one part from the other, so that finger and bearing may be removed from the finger crankshaft without the need for removing the shaft or disturbing any finger assembly other than the one to be serviced.

In keeping with the invention, the bearing assembly may comprise two halves pivotably coupled or hinged so that securing of the assembly on the shaft may easily be effected with a single clamping or securing means, preferably on a side of the bearing journal surfaces opposite from the coupling or hinge portion. Manipulation of the bearing halves for service and repair is easier if they may be coupled together outside of the platform auger tube, preparatory to placing the assembly on the crankshaft.

The bearing halves or portions may extend radially at their opposite sides and the extensions of one or both portions may include a cavity or depression, so that when brought together the two halves provide a socket to receive the inner or butt end of the finger and the cavities and/or butt end of the finger may be shaped so that when the two halves are clamped together the finger is retained, preferably rigidly with respect to the bearing assembly and approximately radially extending with reference to the finger shaft. Thus, the finger may be replaced without the need for replacing a bearing portion.

In keeping with the invention, the bearing halves may be identical in form, making possible reduction of manufacturing and inventory costs and simplifying assembly operations. But though the term "bearing half" is used for convenience, it is not essential to the invention that two parts of the bearing be identical, in form or in other ways.

It is also in keeping with the invention that the bearing halves may be formed by injection molding a suitable tough plastic material which provides its own integral bearing surface and eliminates the need for machining of the bearing surface, and the cavity or hinge portions.

DESCRIPTION OF THE PREFERRED EMBODIMENT

Figure 1:
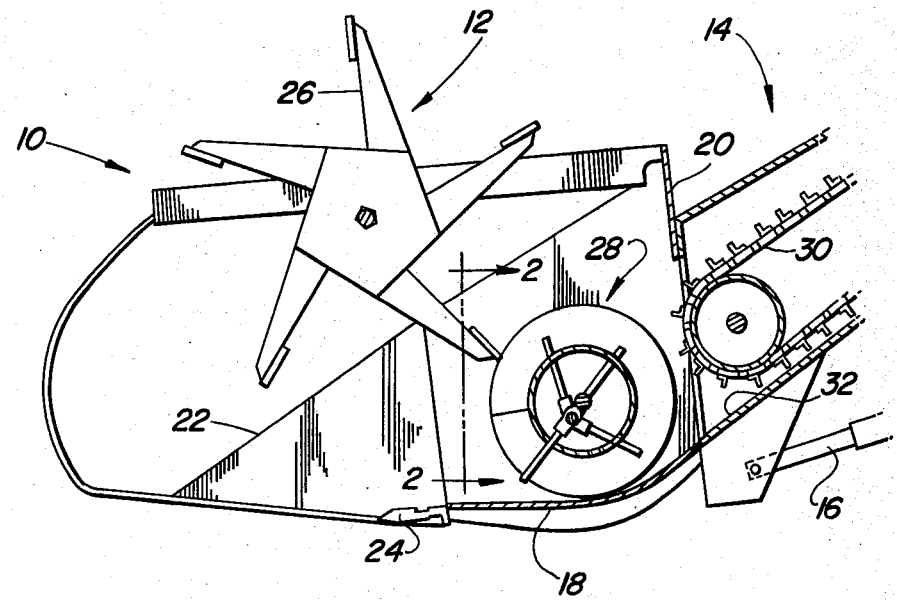
FIG. 1 is a semi-schematic side view of the gatherer platform and forward portion of a feeder house of a combine harvester, the platform including a platform auger embodying the invention.

The invention is embodied in the platform auger of the otherwise conventional grain cutting platform of a combine harvester. A forward portion of the combine header 10 is shown in side elevation in FIG. 1 and includes a grain platform 12 and feeder house 14. Vertical control of the header 10 is provided conventionally by hydraulic cylinders 16.

The grain cutting platform 12 consists of a basic open fronted hopper-like structure defined by a floor 18, a rear wall 20 and opposite side sheets 22. A cutter bar 24 extends forward from the floor to sever the standing crop and a reel 26 rotates above the cutter bar 24 to control the movement of crop material onto the cutter bar 24 and over the forward portion of the floor 18 into engagement with a platform auger 28.

The cutting platform 12 is much wider than the feeder house 14 and the platform auger 28 converges or transfers laterally crop material from the cutter bar for delivery to the feeder house where it is engaged by the feeder house conveyor 30 and moved rearwardly and upwardly over the feeder house floor 32 for delivery to the combine threshing cylinder (not shown).

Figure 2:
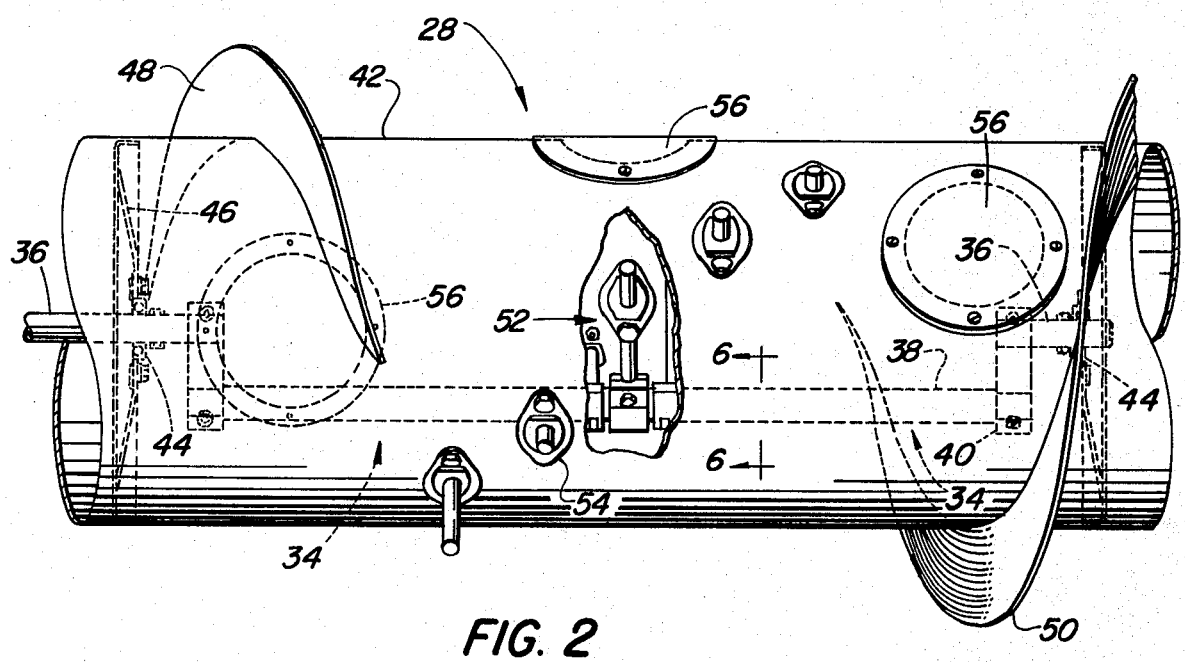
FIG. 2 is an enlarged, generally frontal elevation partially cut away approximately on line 2—2 of FIG. 1, showing the central portion of the platform auger and the general arrangement of the fingers.

The platform auger 28 is conventional in many respects and its general form and mounting will be described only briefly here. Such augers and their operation are well known and a more complete description may be found, for example, in U.S. Pat. No. 2,701,634 Carroll. As indicated in FIG. 2, the platform auger 28 is supported by and journaled on a shaft assembly 34, including epposite co-axial auger shaft portions 36 and an offset or eccentric finger crankshaft portion 38 rigidly connected to the auger shaft portions 36 by a pair of cranks 40. The auger shaft portions 36 at the opposite ends of the auger 28 are mounted and secured against rotation in the end sheets 22 of the platform 12, as is conventional but not shown in the drawings.

The auger structure includes an elongated cylindrical auger tube 42, concentrically mounted and journaled on the auger shaft portions 36 by means of bearing assemblies 44 carrying spiders or bulkheads 46 rigidly attached to the inside of the auger tube 42. Helical auger flighting sections of opposite hand 48 and 50, respectively, cooperate with the platform floor 18 and rear wall 20 as the auger rotates to convey crop material to a central portion of the auger 28 where a plurality of finger assemblies 52 are journaled on the finger crankshaft 38, each finger assembly 52 extending through one of a plurality of guide assemblies 54 mounted in the wall of the auger tube 42 and arranged in two diametrically opposed groups, each group, in terms of disposition of the guides 54, defining a portion of a spiral. Removable covers 56 provide access to the inside of the auger tube 42, for example, for servicing the finger assemblies 52. Suitable conventional drive means (not shown) are provided for rotating the auger 28 on the stub shafts 36.

Each finger assembly 52 includes a pair of bearing halves 58, supporting an elongated finger 60, the two bearing halves 58 being secured together by hinge pin 62 and a fastening or clamping device such as the conventional screw fastener 64, shown.

Each finger 60 has an elongated cylindrical shank portion 66 and an enlarged butt portion 68 of generally rectangular cross-section and a shoulder 70 at the junction between the shank 66 and butt 68 portions. The butt portion 68 includes a hole 72, whose axis is perpendicular to the shank portion 66.

Each bearing half 58 consists of a central bearing wall portion 74 having an internal semi-cylindrical surface 76 and opposite parallel ends 78. At one side of the bearing wall 74 (the hinge side 80), a pair of hinge lugs 82 extend perpendicular to the axis of the bearing surface 76. Hinge pin bores 84 in each lug 82 are co-axial and parallel to the axis of the bearing surface 76. At the opposite side of the bearing wall 74 (the finger retainer side 86), and extending perpendicular to the axis of the bearing surface 76, is a finger retainer portion 88 having an inside face 90 approximately co-planar with the longitudinal axis of the bearing surface 76 and a generally rectangular depression or recess 92 extending into the finger retaining portion 88 from the inside face 90. A hole 94 perpendicular to the face 90 extends through the finger retainer portion 88 from approximately the center of the bottom wall 96 of the depression 92. A finger depression 98, semi-cylindrical in form, extends perpendicular to the axis of the bearing surface 76, between the finger retaining depression 92 and an outer side wall 100 of the bearing half 58.

Each bearing half 58 is preferably made from a tough impactresistant material, able to provide good bearing life without lubrication. One of the polyamides, such as Zytel ST 801 has been used successfully. Compared with the metal bearings conventionally used, use of this type of material results in much quieter operation as well as offering the potential manufacturing advantages of forming by injection molding.

Figure 3:
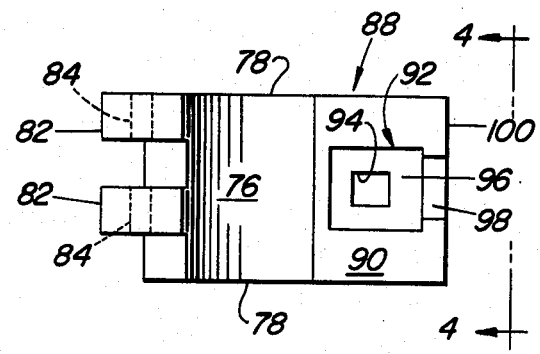
FIG. 3 shows, enlarged, a view of a bearing and finger retainer half taken from inside the bearing surface and perpendicular to the axis of the finger crankshaft.
Figure 4:
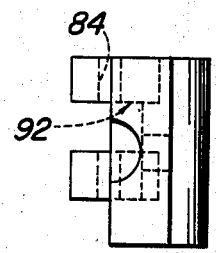
FIG. 4 is an end view of the bearing and finger retainer half taken on line 4—4 of FIG. 3, that is from the finger retaining side of the bearing half.
Figure 5:
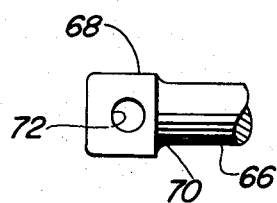
FIG. 5 shows the butt end of one of the crop material moving fingers.
Figure 8:
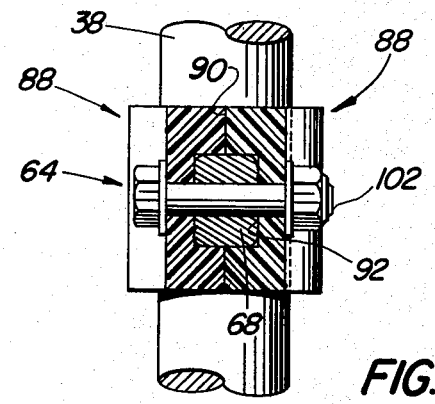
FIG. 8 is a cross-sectional view taken on line 8—8 of FIG. 7, showing the butt end of the finger clamped between the bearing halves.
Figure 6:
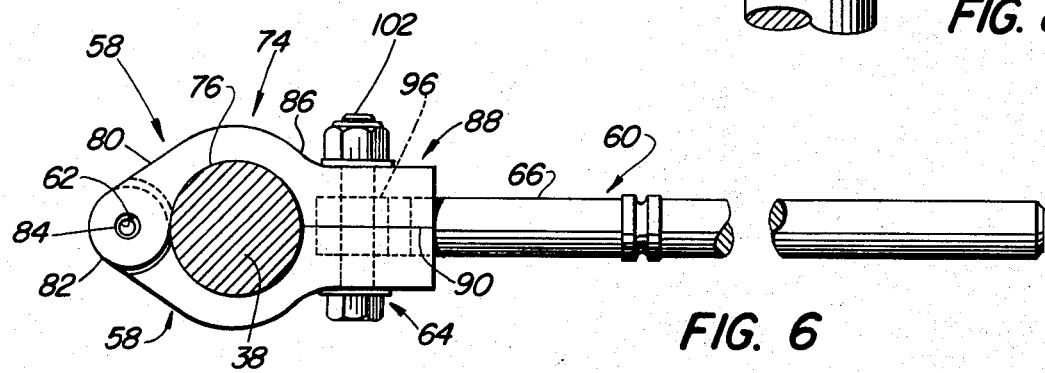
FIG. 6 is an enlarged view of one of the finger and bearing assemblies journaled on the finger crankshaft and viewed on line 6—6 of FIG. 2.
Figure 7:
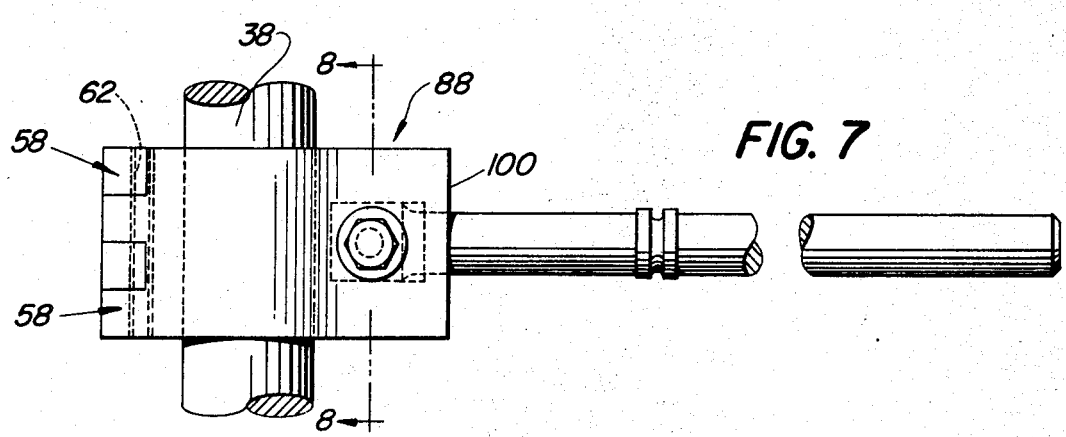
FIG. 7 is an enlarged view perpendicular to the finger shaft and one of the fingers showing a finger and bearing assembly journaled on the finger crankshaft.

As indicated in FIGS. 3, 6 and 7, the offset of the hinge lugs 82 and the disposition of the hinge pin holes 84 is such that if two (identical) bearing halves 58 are brought together with the bearing surfaces 76 opposite and facing each other, the two halves will register so that a hinge pin 62 can be inserted in the holes 84, thus coupling the two halves 58 hingeably or pivotably together with the mating bearing surfaces 76 defining an approximately cylindrical bore. In keeping with the invention, the mating bearing halves need not be identical and other forms of coupling may be used, but the respective halves should include means for engagement, one with the other, so that they become pivotably coupled.

The hinged split bearing may then be opened, placed over and closed around the finger shaft 38. The finger retainer portion 88 of each bearing half 58 is symmetrical about a center line perpendicular to the axis of the bearing surface 76 so that holes 94 and finger retaining recesses 92, as well as finger depressions 98, register. Before closing the coupled bearing halves 58 around the finger shaft 38, a finger 60 is inserted through one of the guides 54 and its butt end 68 is positioned so that the two recesses 92 close around and retain it while the opposite and registering finger depressions 98 embrace the shank 66 of the finger close to the shoulder 70 and the finger 60 is thus held by and between the two bearing halves 58 with the finger shank 66 perpendicular to the axis of the finger shaft 38. The screw-fastener assembly 64 may then be secured with the bolt 102 passing through the holes 94 in the finger retaining portions 88 and the hole 72 in the finger butt 68. With the fastener 64 tightened, integrity of the finger assembly 52 is achieved and it is free to rotate on the finger shaft 38, driven through engagement of the finger shank 66 in a finger guide 54 as the auger 28 is rotated.

If one of the finger assemblies 52 must be removed from the finger shaft 38 for repair or replacement, one of the access covers 56 is removed to gain access to the clamping fastener 64 of the finger assembly 52. Removal of this fastener and spreading apart of the two bearing halves 58, permits removal of the finger 60 and retrieval of the bearing halves 58, conveniently hingeably coupled together by the hinge pin 62. Thus, any one finger assembly 52 may be conveniently removed without disturbing or affecting any other finger assembly and without the troublesome and time-consuming operation of disconnecting the finger shaft 38 and disassembling and reassembling a relatively large number of finger assemblies 52 on and off the shaft 38.

We claim:

1. In a rotatable conveying element, such as a portion of the platform auger of a gathering platform for a mobile harvester, including a hollow drum portion with a wall having a plurality of guide apertures and at least one aperture for access to the interior of the drum and a fixed finger crankshaft mounted inside the drum, the axis of the shaft being parallel and eccentric to the axis of the drum, an improved bearing arrangement accessible through the access aperture, for journaling on the shaft and carrying an elongated conveyor finger, the finger extending through one of the guide apertures so that as the conveying element rotates, the finger rotates about the shaft and alternately extends outwards and retracts with respect to the outer surface of the drum wall, comprising:

first and second bearing halves each half having:
a bearing portion having an inner semi-cylindrical bearing surface such that the first and second halves may be mated at an approximately diametric plane to define a cylindrical bore for journaling on the shaft;
a finger retaining portion extending from the bearing portion in a direction generally perpendicular to the axis of the bearing surface and approximately parallel to the diametric plane, at least one of the bearing halves including means for retaining an end of a finger between a pair of mating halves so that the finger extends generally radially with respect to the bearing surface;
a hinge portion extending from the bearing portion adjacent the bearing surface approximately diametrically opposite the finger retaining portion, each hinge portion including a hinge bore parallel to the axis of the bearing surface and disposed so that when the bearing halves are mated, the hinge bores of the respective first and second halves are co-axial;
a hinge pin for entering the hinge bores when the bearing halves are mated so that they are pivotably coupled together; and
means for holding the finger retaining portions of the first and second bearing halves together, so that a finger engaged by them is retained and so that as the conveying element is rotated the finger and bearing halves are rotated together as a unit about the finger crankshaft.

2. In a forward mounted gatherer for a mobile harvesting machine having a generally transverse elongated rotatable platform auger for receiving gathered crop material and transferring it laterally to the inlet of a feeder conveyor, flighting of the auger ending adjacent the feeder conveyor inlet, the auger having a tubular portion registering with the feeder conveyor inlet and including a plurality of spaced guide apertures and at least one aperture for access to the interior of the tubular portion in the wall of said tubular portion and a fixed eccentrically disposed finger crankshaft within the tubular portion, a plurality of improved bearing and finger assemblies, each assembly comprising:

an elongated finger;
first and second bearing halves, each half having a bearing portion including an inner semi-cylindrical bearing surface and approximately diametrically opposite finger retaining and hinge portions respectively integral with the bearing portion, at least the first half finger retaining portion having a cavity for receiving the end of the finger;
means for pivotably coupling the hinge portions of the respective first and second halves so that together they may be closed around the shaft so that the finger retaining portions meet and are accessible through the access aperture and hold the finger so that it extends radially with respect to the shaft, the finger extending through one of the apertures of the wall of the auger tubular portion and the halves being mated so that the opposed bearing surfaces of the respective bearing halves form a cylindrical bore for journaling freely on the finger crankshaft so that as the auger rotates the finger alternately extends and retracts with respect to the wall of the auger tubular portion; and
means for holding the respective finger retaining portions of the bearing halves together.

3. The invention defined in claim 2 wherein each hinge portion has a hinge pin bore parallel to the axis of the bearing surface and the means for pivotably coupling the hinge portions of the bearing halves includes a hinge pin for passing through the respective hinge pin bores and securing one half to the other, said respective hinge pin bores being disposed so that with the bearing halves coupled, the respective inner bearing surfaces are in mating alignment.

4. The invention defined in claim 2 wherein the end of the finger includes a transverse bore and each finger retaining portion includes a bore approximately perpendicular to the bearing surface axis and said bores are disposed so that with the respective bearing halves closed around the finger crankshaft and retaining the end of the finger, said bores are in alignment and wherein the means for holding the respective finger retaining portions together comprises an elongated fastener for passing through the bores, the fastener having means at each of its opposite ends for engaging the finger retaining portions for holding them together.

5. The invention defined in claim 2 wherein the finger has an enlarged portion adjacent one end and said enlarged portion is received and retained at least partially in the cavity of the first bearing half.

* * * * *